(12) United States Patent
Peters

(10) Patent No.: US 10,287,102 B2
(45) Date of Patent: May 14, 2019

(54) CONNECTION DEVICE

(71) Applicant: MULTIPOND WÄGETECHNIK GMBH, Waldkraiburg (DE)

(72) Inventor: Andreas Peters, Aschau am Inn (DE)

(73) Assignee: MULTIPOND WÄGETECHNIK GMBH, Waldkraiburg (DE)

( * ) Notice: Subject to any disclaimer, the term of this patent is extended or adjusted under 35 U.S.C. 154(b) by 0 days.

(21) Appl. No.: 15/609,693

(22) Filed: May 31, 2017

(65) Prior Publication Data
US 2017/0341871 A1   Nov. 30, 2017

(30) Foreign Application Priority Data

May 31, 2016   (EP) ..................................... 16172303

(51) Int. Cl.
| | | |
|---|---|---|
| B65G 27/08 | (2006.01) | |
| B65G 27/00 | (2006.01) | |
| F16B 1/00 | (2006.01) | |
| G01G 17/00 | (2006.01) | |
| B25B 11/00 | (2006.01) | |

(52) U.S. Cl.
CPC ............ B65G 27/08 (2013.01); B25B 11/002 (2013.01); F16B 1/00 (2013.01); G01G 17/00 (2013.01); *B65G 2812/0348* (2013.01); *F16B 2001/0035* (2013.01)

(58) Field of Classification Search
None
See application file for complete search history.

(56) References Cited

U.S. PATENT DOCUMENTS

| | | | | |
|---|---|---|---|---|
| 5,967,294 | A | * 10/1999 | Patterson | ............... B65G 27/08 198/760 |
| 6,037,549 | A |   3/2000 | Weck | |
| 8,251,204 | B1 | * 8/2012 | Mazza | ................... B65G 27/24 198/757 |
| 2014/0299621 | A1 | 10/2014 | Matsuhisa | |

FOREIGN PATENT DOCUMENTS

EP    0 852 707 B1    1/2003

OTHER PUBLICATIONS

Office Action (in German) dated Jun. 28, 2017 in application EP 16172303, partial machine translation provided; references D1 and D2 cited in prior Information Disclosure Statement, references D3 and D4 cited herewith.

(Continued)

*Primary Examiner* — Kavel Singh
(74) *Attorney, Agent, or Firm* — Hassan Abbas Shakir; Shakir Law PLLC

(57) ABSTRACT

A connection device connects a driving device and a feeding device and is for use in a scale or combination scale. A connection element has at least one magnet. A receiving device, which is located within the feeding device, includes at least one iron core. The receiving device includes a protrusion, where the receiving device meshes with the connection element in the mounted state for a simple, interlocking, and backlash-free self-centering connection.

12 Claims, 4 Drawing Sheets

(56) References Cited

OTHER PUBLICATIONS

99Chemicals: "How to Remove a Neodymium Hard Drive Magenet From Its Bracket", Nov. 5, 2011 (Nov. 5, 2011), p. 1, XP054977455, https://www.youtube.com/watch?v=GQhSy-Kz5DM (retrieved Jun. 20, 2017) (English), one screenshot provided, cited in Office Action (in German) dated Jun. 28, 2017 in application EP 16172303.
99Chemicals: "How to Remove a Neodymium Hard Drive Magenet From Its Bracket", Nov. 5, 2011 (Nov. 5, 2011), https://www.youtube.com/watch?v=GQhSy-Kz5DM (retrieved Jun. 21, 2017) (English), multiple screenshots provided, cited in Office Action (in German) dated Jun. 28, 2017 in application EP 16172303.
European Search Report dated Nov. 7, 2016 in application EP 16172303, partial machine translation attached.

\* cited by examiner

CONNECTION DEVICE

BACKGROUND OF THE INVENTION

1. Field of the Invention

The present application is directed to a connection device, in particular for the use of a connection of a feeding device for a scale and a driving means, in order to transmit the movements of the driving means to the feeding device.

2. Discussion of the Related Art

In particular in the case of scales and combination scales, products to be weighed are distributed by a distribution device and are led to the respective weighing container by feeding devices, which can for example be designed in the shape of a vibration channel, which are forced to vibrate, for example by electromagnetic driving means. For such a use, it is in particular necessary that the feeding devices can be easily dismantled for cleaning purposes and are also easily reinstallable.

Simultaneously, feeding devices have to be connectable via a stable connection device with the driving device. Hereby, the connection device has to be able to transmit the vibrations, oscillations or other movements generated by the driving device to the feeding device. Simultaneously, it is in particular important for the use in food industry or food processing industry that such a feeding device or the related connection device can be designed hygienically, so that an input or an adhesion of contaminations, e.g. food from a previous processing step, can be avoided, and that an easy and thorough cleanability is possible.

In the prior art, a connection device for a combination scale is known from EP 0 852 707 B1, in which the movements of a vibration engine are transmitted to a vibration channel via a backlash-free connection. Said connection device has a cylindrical intermediate part, one end thereof being connected with the driving means. The other end of the cylindrical intermediate part is connected to a bottom part via screws, wherein the bottom part can be connected with the bottom side of the vibration channel. By the provision of multiple guide bolts, bores, steps and hubs, the angle position of the vibration channel relative to the distribution device and the weighing containers is variable, so that the feeding of the products can be performed in an optimal way. Furthermore, a clamping element, being adjustable via a clamping lever, is provided, by which the pressing force of the connection element to the bottom part of the distribution device can be adjusted.

Such a design, however, encompasses significant disadvantages, in particular for plants of the food industry or food processing industry. On the one hand, the connection contains several movable mechanical components. For vibrations obtained by a vibration engine as driving means, the dynamics of such a mechanical system can be hardly predicted. Furthermore, the connection unit according to the mentioned prior art is not designed hygienically, as it contains, caused by bores and bolts, many edges, void spaces and narrow spaces in which food remainders or dirt can easily accumulate, which cannot be removed easily by cleaning, and which can contaminate fresh food by migration via the air or direct contact. This can lead to the fact that food is not durable any more and can even be contaminated or poisoned. A contamination via food remainders can furthermore lead to a disturbance or influence of the dynamics of the connection device. Furthermore, the clamping lever for releasing said connection can only be reached with significant difficulties. In addition, the assembly cannot be sealed because of the complex mechanical system with bolts, bores, steps and hubs. Furthermore, the mentioned clamping lever has to be precisely adjusted during mounting in order to ensure an optimal adjustment of the feeding device. Furthermore, wear can occur on the mounted clamping lever and on members which are connected thereto (e.g. bearings), which leads to decreasing forces up to the complete loss of the interlocking connection.

Such a member hence encompasses significant disadvantages, in particular for the use in food industry or food processing industry.

It is hence an objective technical problem of the present application to provide a connection device which solves the above mentioned problems and in particular leads to a hygienic design. Furthermore, it is an objective technical problem of the present application to provide a connection device with an easy handling, the connection with it being backlash-free. Furthermore, it is an objective technical problem of the present application to provide a connection device for which potential wear at the guiding planes does not lead to a deterioration of the connection.

SUMMARY OF THE INVENTION

Said objective technical problem is solved by a connection device and by a process for the establishing and releasing of a connection of a connection device.

The present invention contains a connection device which is basically composed of a connection element and a receiving device, wherein the receiving device is coupled to the feeding device. The feeding device comprises an upper side for feeding of products and an adjacent lower side. The connection element can be coupled with a driving device. Further, the receiving device is designed such that it can receive the upper part of the connection element. The connection element includes at its upper side at least one first magnet, in embodiments also a second magnet. The receiving device basically includes a base, which in turn includes at least one iron core, in embodiments also a second iron core. The base is coupled at least to one protrusion, with which the connection element can be meshed in the coupled state, so that an interlocking connection can be obtained. In the connected state, magnet(s) and iron core(s) face each other. The connection element and the receiving device are preferentially made of stainless steel with non-ferromagnetic characteristics, preferentially made of austenitic steel. Magnets are preferentially permanent magnets, more preferentially permanent magnets made of neodymium.

By the use of magnet connections and a suitable geometry of the connection element and the receiving device, an easy mounting and a self-centering of both members is possible. Furthermore, the number of corners, edges, immersions and void spaces can be minimized, so that a hygienic design is possible.

BRIEF DESCRIPTION OF THE DRAWINGS

In the following, a preferred embodiment is further explained with reference to the enclosed figures.

DETAILED DESCRIPTION OF THE INVENTION

Figure 1:
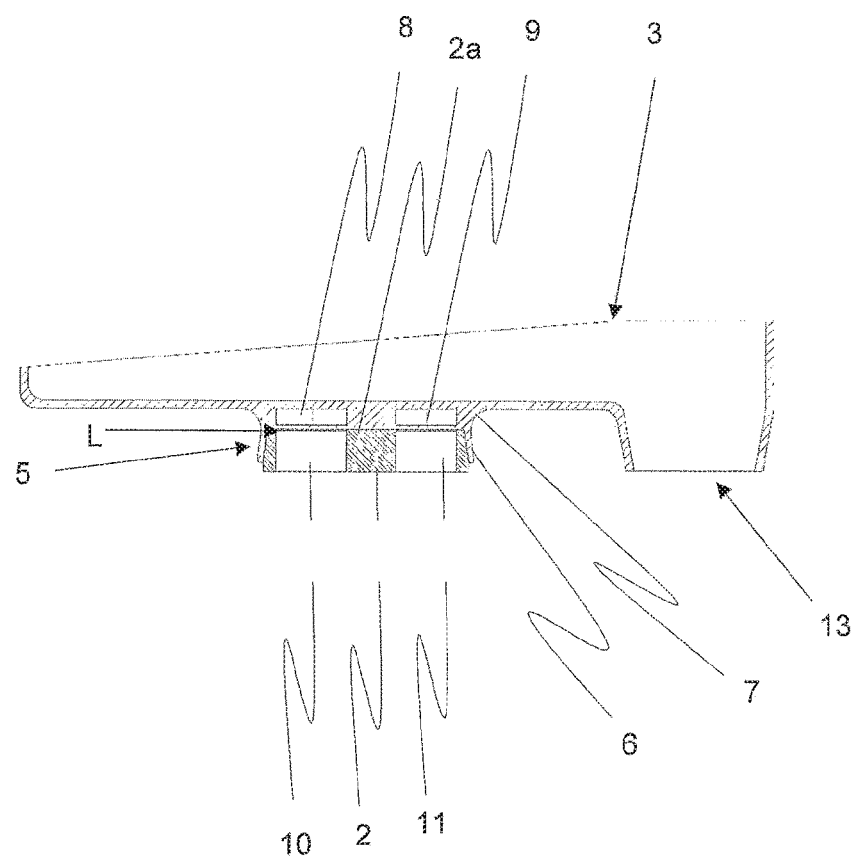
FIG. 1 shows a feeding device according to a first embodiment, including a receiving device and a connection element.

FIG. 1 shows a connection device 1 according to a first embodiment in a cross-sectional view. A feeding device is labelled with the reference sign 3, which is a vibration channel in the present embodiment, on which products are deposited and are moved in the direction of a funnel opening 13 on the right side in the Figure, in order to be dropped from there. The connection device 1 is provided at the lower side of the feeding device 3, approximately in the middle of the longitudinal extension. The connection device 1 basically comprises a receiving device 5 and a connection element 2.

In the present embodiment, the receiving device 5 is formed integrally with the feeding device 3. Alternatively, the connection of the feeding device 3 and the receiving device 5 can be obtained via welding, gluing, etc. The receiving device 5 includes a base 7, which is formed in a way that it incorporates two iron cores, a first iron core 8 and a second iron core 9. Both iron cores 8, 9 are hence provided inside the base 7. In the present embodiment, both iron cores 8 and 9 are formed in a disk shape and are incorporated inside the base 7. The receiving device 5 has a flush, smooth surface without joints, edges, etc., in which contaminations could accumulate. At the outer circumference of the base 7, a protrusion 6 in the shape of a rib or a wall is connected. The protrusion 6 is formed in a way that it includes an acute angle with the perpendicular line of the surface of the feeding device 3 on the side facing the interior of the base 7. Thereby, a receiving recess is formed, whose cross-sectional area decreases from the outer edge of the protrusion 6 in a direction towards the base 7 continuously, so that the recess comprises a conical shape tapered to the inside.

The connection element 2 being in mesh with the receiving device 5 is connected with a driving device (not shown here), for example a vibration engine. It comprises a shape designed in a way that it fits into the receiving device 5 and can be received by it. It has a conical or frustum shape in the upper section, respectively, which basically has a same angle compared to the conical receiving device 5. A first magnet 10 and a second magnet 11 are integrated into the connection element 2. Those are, congruently to the iron cores 8, 9 in the receiving device 5, respectively provided within the connection element 2, i.e. for example integrated into respective recesses, glued or even infused. The recesses can be closed with a cap, which is welded with the surface of the connection element 2. Hence, recesses, notches, gaps or the like are avoided here, in which contaminations could accumulate.

The dimensions of the receiving device 5 and the connection element 2 are designed in a way that a small air gap L between the adjacent surfaces is obtained in the connected state, and that both conical outer walls or inner walls are in contact with each other. Beyond said fact, the following advantage can be achieved: Even if a contamination should be present on one of both surfaces once, a perfect positioning and a close contact can be ensured, as said contamination finds room in the provided gap. Even if insufficient cleaning is performed, the function can still be ensured despite contaminations which are not completely removed. By the simple connection of the receiving device 5 and the connection element 2, the feeding device 3 can be easily dismantled and subjected to cleaning, whereby clean members can be used all the time.

The connection device 1 is shown in the mounted state in FIG. 1, i.e. the connection element 2 is in mesh with the protrusion 6 of the receiving device 5. Hence, the first magnet 10 of the connection element 2 faces the first iron core 8 of the receiving device 5, and the second magnet 11 of the connection element 2 faces the second iron core 9 of the receiving device 5. Furthermore, the formation of an air gap L between the upper side 2a of the connection element 2 and the receiving device 5 is enabled by the alignment of the protrusion 6 in an acute angle to the perpendicular line of the surface of the feeding device 3 and the frustum-like or conical shape of the connection element 2. By this air gap L, space for potentially occurring accumulations can be created, which would not prevent a clean, interlocking connection in this case.

Figure 2:
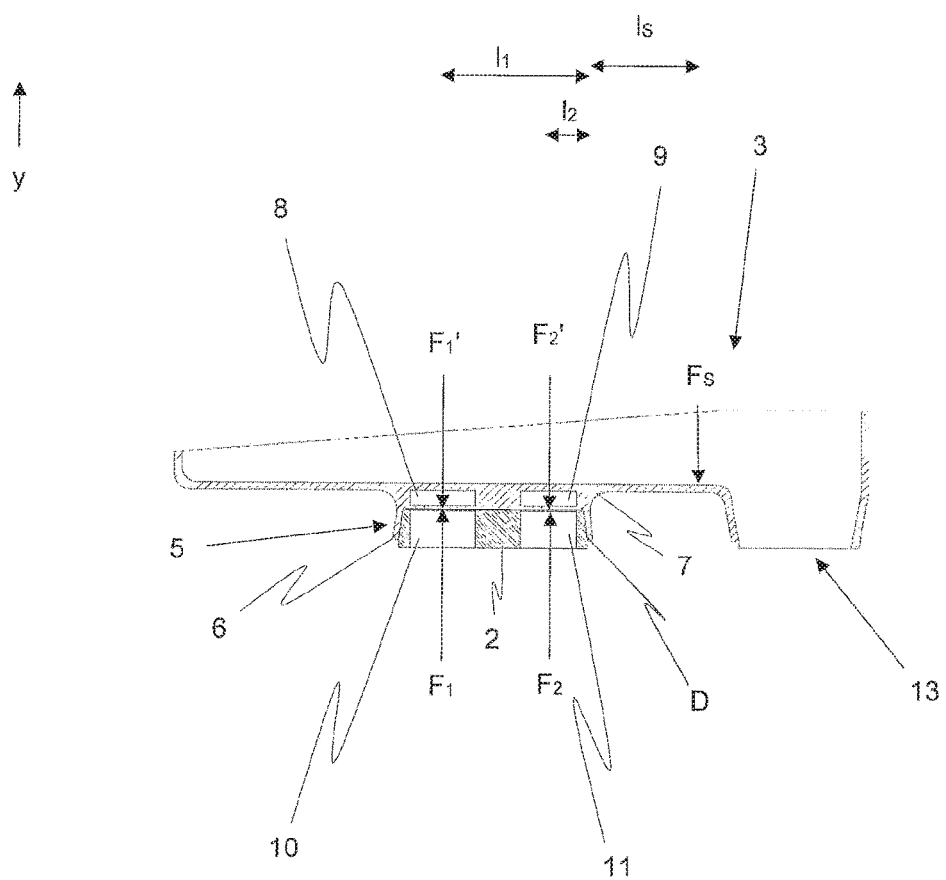
FIG. 2 shows the feeding device according to FIG. 1, wherein the individual forces, acting at both the magnets and the feeding device, are shown.

FIG. 2 basically corresponds to FIG. 1. In FIG. 2, however, the forces are presented which act on individual points of the feeding device 3: at the center of gravity of the feeding device 3, the weight force $F_S$ acts in negative y-direction, wherein both reaction forces $F_1$ and $F_2$ act on the first magnet 10 and the second magnet 11 in positive y-direction by both iron cores 8 and 9.

During operation of the feeding device 3, the weight force $F_S$ of the feeding device 3 is not constant, as the feeding device 3 can be impinged, in addition to its own weight, with the weight force of products which have their own mass. As said products still move, also the position of the center of gravity of the whole system of feeding device 3 and products constantly changes. Hence, the resulting reaction forces $F_1$ and $F_2$ respectively depend on the weight force $F_S$ and the distances of the forces $F_1$, $F_2$ and $F_S$ from the rotation point D. Counter-forces to the reaction forces $F_1$ and $F_2$ are the holding force $F_1'$ and $F_2'$ caused by the magnets.

Herein, the magnetic forces of the first magnet 10 and the second magnet 11 are selected in a way that they can respectively cause a higher holding force $F_1'$ and $F_2'$ compared to the respective reaction forces $F_1$ and $F_2$.

As visible in FIG. 2, the magnets 10, 11 are positioned in a way that a first holding moment $M_1'$ obtained by the first holding force $F_1'$ and the lever arm $l_1$ is greater than a second holding moment $M_2'$ obtained by the second holding force $F_2'$ and the lever arm $l_2$, what can be caused even for assumed theoretically equal holding forces $F_1'$, $F_2'$ only by different distances ($l_1$, $l_2$) from the rotation point D.

As the magnetic force of the first magnet 10 is further selected to be greater than the magnetic force of the second magnet 11, the first holding moment $M_1'$ is thereby enlarging compared to the second holding moment $M_2'$. It has to be noted in this case that the magnetic forces decrease because of the air gap L, more precisely square proportional with the distance between magnets 10, 11 and iron cores 8, 9; i.e. said distance has to be kept small.

By the selection of the magnetic forces, it can be ensured that a detachment of the receiving device 5 from the connection element 2 can be safely prevented because of the holding forces $F_1'$ and $F_2'$ caused by the magnets, which are greater than the maximally possible reaction forces $F_1$ and $F_2$. The longer lever arm $l_1$ of the magnetic force of the first magnet 10 significantly contributes to the generation of a respective holding moment $M_1$.

As the center of gravity of the connection element 2 including the supplied mass can be outside of the receiving device 5, a potential tilting moment (in FIG. 2 clockwisely) can be avoided by the holding moments $M_1'$ and $M_2'$ (in FIG. 2 counter-clockwisely), which are generated by the magnetic forces of the first magnet 10 ($F_1'$) and the second magnet 11 ($F_2'$).

Figure 3:
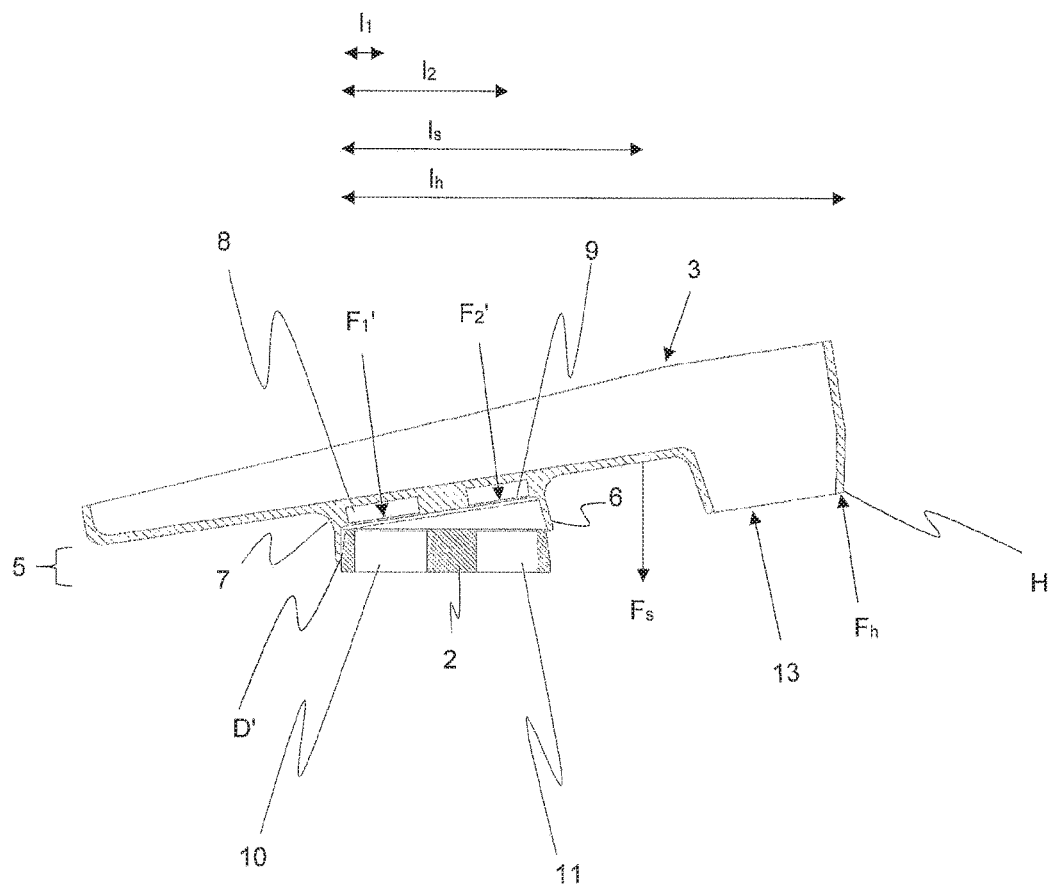
FIG. 3 shows the feeding device according to a first embodiment in a situation in which the receiving device is dismantled from the connection element. Also for this case, the forces during dismantling are presented.

FIG. 3 shows a connection device 1 during dismantling, i.e. while the feeding device 3 is detached from the connection element 2. Compared to FIG. 2, the forces generated by the magnets and the resulting moments ($F_1'$ and $M_1'$ at the first magnet 10, $F_2'$ and $M_2'$ at the second magnet 11) are basically equal, before the feeding device 3 begins to move away from the connection element 2. The weight force $F_S$ of the feeding device 3 counter-acts a detachment force $F_h$, which is applied to a point H of the feeding device 3, in FIG. 3 at the right lower end. The rotation point for the detachment of the feeding device 3 is now at the position D', The application of the force $F_h$ at the right end of the feeding device generates, caused by its longer lever arm $l_h$, a great detaching moment $M_h$ around the rotation point D'. The counter-acting holding moments $M_1$ and $M_2$ of the magnetic holding forces $F_1'$ (deriving from the first magnet 10) and $F_2'$ (deriving from the second magnet 11) have, however, only small lever arms $l_1$ and $l_2$. Herein, the greater one of both forces, $F_1$, has the smallest lever arm $l_1$. The detachment of the connected elements can be performed very easily in this way, as the greatest holding force $F_1'$ (caused by the greatest magnetic force) generates the smallest moment $M_1$. After beginning of the detachment, the forces $F_1'$ and $F_2'$, deriving from the magnets 10, 11, decrease because of the continuously increasing gap between the magnets 10, 11 and iron cores 8, 9, thereby also continuously decreasing the holding moments $M_1'$ and $M_2'$.

In the following, the process for establishing and detaching the connection of the connection element 2 and the receiving device 5 shall be described.

For establishing the connection, the connection element 2 is brought with its upper side 2a into direct proximity of the receiving device 5, so that the first iron core 8 of the receiving device 5 and the first magnet 10 of the connection element 2, and the second iron core 9 of the receiving device 5 and the second magnet 11 of the connection element 2 face each other, so that magnetic attraction forces are established and can act. The resulting magnetic forces cause that the connection element 2 approaches the receiving device 5 and is meshed within the protrusion 6 of the receiving device 5 in a self-centering way. The distance between the receiving device 5 and the connection element 2 decreases continuously, until the connection element 2 has reached its final position within the receiving device 5. In this final position, only the narrow air gap L is present between the receiving device 5 and the connection element 2.

For detaching of the connection, a pressing force $F_h$ is applied to a point (point H in FIG. 3) of the feeding device 3, which has a larger distance from the first iron core 8 than from the second iron core 9. The point H, to which the force for detaching $F_h$ is applied, is different from the center of gravity of the feeding device 3 in FIG. 3. By the resulting rotation moments, the holding force $F_2'$ is overcome first, and then, the distance between connection element 2 and receiving device 5 begins increasing in the area in which the second iron core 9 and the second magnet 11 are provided. Only when further rotation around the rotation point D' is performed, also the distance between areas, in which the first magnet 10 in the connection element 2 and the first iron core 8 in the receiving device 5 are provided, begins to increase, when also the holding force $F_1'$ is overcome. The frustum shape of the connection element 2 and the arrangement of the protrusion 6 in an acute angle with the perpendicular line of the surface of the feeding device 3 hence allow a rotation around the rotation point D'.

Figure 4:
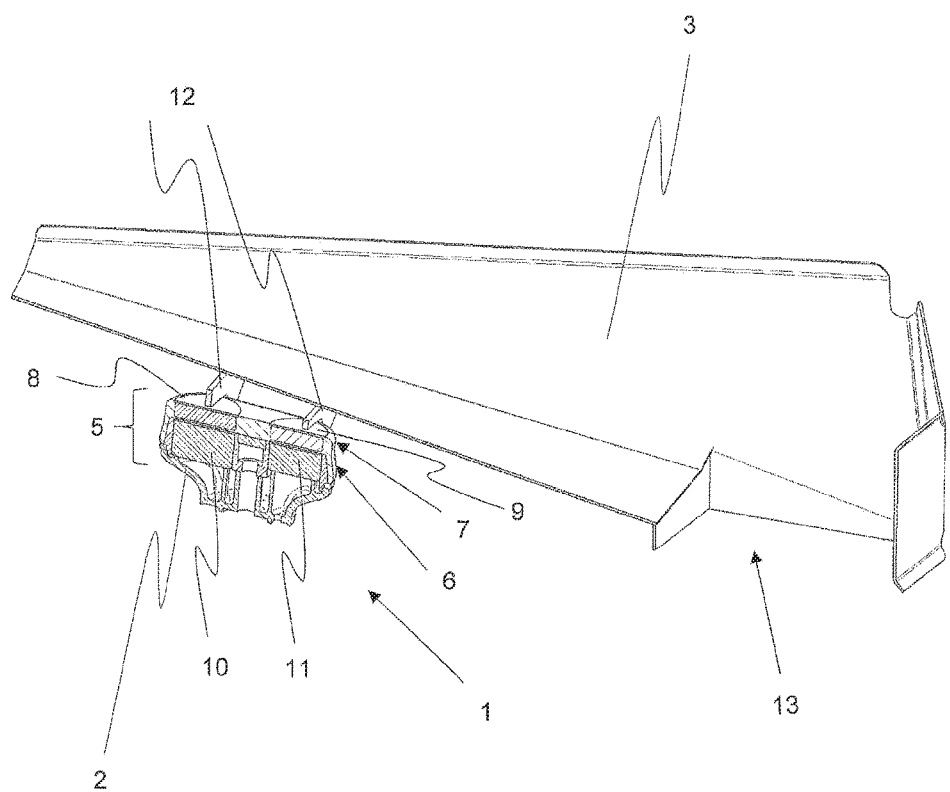
FIG. 4 shows a feeding device according to a second embodiment, which includes a receiving device, wherein a connection element is in mesh with a projection of the receiving device.

FIG. 4 shows a second embodiment of the invention. Contrary to the first embodiment, the receiving device 5 is not integrally formed with the feeding device 3 and is not welded to it, but is connected to it via two holding devices 12. Hence, the receiving device 5 is provided with a distance to the feeding device 3.

The feeding device 3 furthermore has no rotationally symmetric shape, but is formed in an oval shape.

Furthermore, the connection element 2 has hollow sections in the inside and is not formed in a continuously massive manner.

Further Embodiments

The present invention is not limited to the above-mentioned embodiment.

For example, further geometries of the connection element 2 are possible. This does not have to be necessarily formed in a rotationally symmetric or oval shape. Also, polygonal shapes are possible, e.g. square or rectangular, or composite shapes.

Furthermore, there are further possibilities for the design of the protrusion 6, wherein, however, the protrusion 6 always has to be in mesh with the connection element 2 and no press fit must be present, in order to enable a rotation around the rotation point D'.

Furthermore, it is not necessary to design the protrusion 6 continuously. Multiple partial protrusions with distances therebetween are also possible.

Furthermore, it is also possible to provide the first magnet 10 and/or the second magnet 11 not as permanent magnets, but as electromagnets. In this case, electrical lines for the supply of both magnets would have to be provided through the connection element 2. For this purpose, a respective bore would have to be provided.

Furthermore, it is not necessary to provide the iron cores 8 and 9 within the connection element 2. A variation is also possible, for which in turn both magnets 10, 11 are provided on the upper side 2a of the connection element 2. Furthermore, it is possible that both iron cores 8, 9 are not provided within the base 7 of the feeding device 3, but would be mounted at the lower surface of the base 7.

Furthermore, it is also possible to provide the iron cores 8, 9 on the connection element 2 and to provide both magnets 10, 11 on the receiving device 5.

Furthermore, the invention is not limited to exactly two magnets. It is also possible to provide more than two magnets, wherein in the latter case, it has to be regarded that individual magnets which have a larger distance from the center of gravity of the feeding device 3, need to have a greater magnetic force compared to those magnets which are provided closer to the center of gravity of the feeding device 3.

Furthermore, a solution with only one magnet and/or one iron core is possible. Herein, at least one selected from magnet and iron core has to be shaped in a way that the magnetic force decreases with increasing distance from the rotation point (D'). This can, for example, be achieved by a respective shape of the magnet and/or iron core (for example in the shape of the segment of a circle). Also in this way, the connection element 2 and the receiving device 5 are formed in a way that they can be detached from each other by tilting around the rotation point (D').

Depending on the shape of the connection element 2 and the protrusion 6, respective rotation axes can be present instead of the rotation points D and D'.

The invention claimed is:

1. A connection device for connecting a feeding device with a driving device, the feeding device comprising an upper feeding device side and a lower feeding device side opposite the upper feeding device side, the upper feeding device side for feeding a product the connection device comprising:
   a receiver disposed on the lower feeding device side, the receiver comprising
      a first coupling element
      an outer circumference of a base of the receiver; and
      a protrusion disposed at the outer circumference;
   a connection element comprising an upper connection side and a second coupling element;
   a first magnet and a first iron core, the first magnet interacting with the first iron core to create a first magnetic holding force;
   a second magnet and a second iron core, the second magnet interacting with the second iron core to create a second magnetic holding force;
   wherein in an attached state
      the first coupling element facing the second coupling element, and the first connection element by the first magnetic holding force; and
      the connection element meshing with the protrusion;
   wherein the receiver is tiltable relative to the connection element around a rotation point to detach the receiver from the connection element;
   wherein the first coupling element or the second coupling element is formed to decrease the magnetic holding force with an increasing distance from the rotation point;
   wherein
      the first coupling element is the first magnet and the second coupling element is the first iron core, or
      the first coupling element is the first iron core and the second coupling element is the first magnet;
   wherein
      the receiver comprises a third coupling element, and the connection element comprises a fourth coupling element;
   wherein the third coupling element faces the fourth coupling element;
   wherein the third coupling element is aligned with the second iron core to couple the receiver and the fourth coupling element by the second magnetic holding force; and
   wherein
      the third coupling element is the second magnet and the fourth coupling element is the second iron core, or
      the third coupling element is the second iron core and the fourth coupling element is the second magnet.

2. The connection device of claim 1, wherein the receiver comprises a base, the base is formed integral with the feeding device, glued to the feeding device, welded to the feeding device, or connected via a holding device to the feeding device.

3. The connection device of claim 2 wherein the first coupling element or the second coupling element is disposed inside the receiver.

4. The connection device of claim 1, wherein the first coupling element or the second coupling element is disposed inside the connection device.

5. The connection device of claim 1, wherein the first magnet is a permanent magnet.

6. The connection device of claim 1, wherein the connection element is connected to the driving device.

7. The connection device of claim 1, wherein the first magnet has a first distance from a center of gravity of the feeding device and the second magnet has a second distance from the center of gravity of the feeding device, wherein the first distance is greater than the second distance.

8. The connection device of claim 7,
   wherein the first magnet has a first magnetic force and the second magnet has a second magnetic force; and
   wherein the first magnetic force creates a greater holding force than the second magnetic force.

9. The connection device of claim 1, wherein the receiver has a first conical shape and the connection element has a second conical shape, the first conical shape and the second conical shape being complementary, fit into each other, and are self-centering.

10. The connection device of claim 1, wherein, in the attached state, the receiver and the connection element comprise an air gap between the receiver and the connection element.

11. The connection device of claim 1, wherein the receiver and the connection element, comprise stainless steel with non-ferromagnetic characteristics.

12. The connection device of claim 1, wherein the receiver and the connection element comprise austenitic steel.

* * * * *